United States Patent
Bühler

(10) Patent No.: US 11,215,226 B2
(45) Date of Patent: Jan. 4, 2022

(54) STRAY FLUX COMPENSATION IN A MAGNETIC BEARING DEVICE

(71) Applicant: MECOS AG, Zürich (CH)

(72) Inventor: Philipp Bühler, Zürich (CH)

(73) Assignee: MECOS AG, Zürich (CH)

(*) Notice: Subject to any disclaimer, the term of this patent is extended or adjusted under 35 U.S.C. 154(b) by 15 days.

(21) Appl. No.: 16/631,913

(22) PCT Filed: Jul. 5, 2018

(86) PCT No.: PCT/EP2018/068285
§ 371 (c)(1),
(2) Date: Jan. 17, 2020

(87) PCT Pub. No.: WO2019/015987
PCT Pub. Date: Jan. 24, 2019

(65) Prior Publication Data
US 2020/0158173 A1    May 21, 2020

(30) Foreign Application Priority Data
Jul. 20, 2017  (EP) ..................... 17182240

(51) Int. Cl.
*F16C 32/04*    (2006.01)
*H02K 7/09*    (2006.01)

(52) U.S. Cl.
CPC ...... *F16C 32/0463* (2013.01); *F16C 32/0457* (2013.01); *F16C 32/0476* (2013.01); *H02K 7/09* (2013.01)

(58) Field of Classification Search
CPC .............. F16C 32/0463; F16C 32/0457; F16C 32/0476; F16C 32/0485; F16C 32/0461; F16C 32/0446; F16C 32/0459; H02K 7/09

USPC ........................................................ 310/90.5
See application file for complete search history.

(56) References Cited

U.S. PATENT DOCUMENTS

| 5,084,644 | A | 1/1992 | Harris et al. |
| 5,682,071 | A | 10/1997 | Buhler et al. |
| 7,635,937 | B2 | 12/2009 | Brunet et al. |
| 2007/0164627 | A1* | 7/2007 | Brunet ............... F16C 32/0476 310/90.5 |

(Continued)

FOREIGN PATENT DOCUMENTS

| DE | 10 2010 013 675 A1 | 10/2011 |
| DE | 102010013675 | * 10/2011 |
| WO | 2005/121580 A1 | 12/2005 |

OTHER PUBLICATIONS

International Search Report for PCT/EP2018/068285 dated Oct. 15, 2018 [PCT/ISA/210].

(Continued)

*Primary Examiner* — Ahmed Elnakib
(74) *Attorney, Agent, or Firm* — Sughrue Mion, PLLC

(57) ABSTRACT

A magnetic bearing device for magnetically suspending a rotor (22) for rotation about a rotation axis (A) comprises an amplifier device, a first main coil (p) and a second main coil (n). In order to compensate for a stray flux that is created when the main coils are supplied with currents from the amplifier device, a compensation coil (c) is connected between a common node of the main coils and the amplifier device with such polarity that a current flowing through the compensation coil will diminish the stray flux caused by the main coils (p, n).

11 Claims, 4 Drawing Sheets

(56) References Cited

U.S. PATENT DOCUMENTS

2008/0265704 A1* 10/2008 Buhler .................... H02K 7/09
                                                     310/90.5
2012/0306305 A1   12/2012 Filatov
2017/0335889 A1* 11/2017 Maki-Ontto ............ H02K 7/09

OTHER PUBLICATIONS

Written Opinion for PCT/EP2018/068285 dated Oct. 15, 2018 [PCT/ISA/237].

* cited by examiner

STRAY FLUX COMPENSATION IN A MAGNETIC BEARING DEVICE

CROSS REFERENCE TO RELATED APPLICATIONS

This application is a National Stage of International Application No. PCT/EP2018/068285 filed Jul. 5, 2018, claiming priority based on European Patent Application No. 17182240.6 filed Jul. 20, 2017.

TECHNICAL FIELD

The present invention relates to a magnetic bearing device and to a method of operating a magnetic bearing device.

PRIOR ART

Magnetic bearings are often used to support a rotor with a shaft in a contactless manner. One type of magnetic bearing is an axial bearing, which inhibits movement of the rotor in an axial direction with respect to its rotation axis. To this end, the rotor often comprises a disk-shaped portion, and two stator assemblies are arranged facing the two opposite sides of the disk-shaped portion. Each stator assembly comprises a coil that extends around the shaft. By supplying currents to the coils, each coil generates a magnetic field. As the stator assemblies and the rotor comprise magnetically conductive materials, the magnetic field results in a magnetic flux that passes through the respective stator assembly and the rotor, crossing the air gap between the stator assembly and the rotor, and thereby generating an attractive magnetic force which pulls the rotor towards the respective stator assembly. By employing a position sensor for measuring the axial position of the rotor and controlling the currents through the two coils according to the sensor output, the axial position of the rotor relative to the stator assemblies can be controlled. The stator assemblies are often surrounded by a housing, which can be made of magnetically conductive material.

The magnetic fields generated by the coils also cause a stray flux through the shaft and through the housing that surrounds the stator assemblies. Such stray flux is usually undesired as it can have detrimental effects on other parts of the machine, in particular on the position sensors, on the radial magnetic bearings, on the auxiliary bearings and on the seals. Furthermore, the stray flux can create disturbances in external systems if stray fields extend to regions outside of the housing. If the rotor is driven by an electric motor, the stray flux can also negatively impact the operation of the electric motor.

In order to reduce the stray flux, U.S. Pat. No. 5,084,644 suggests providing an additional compensation coil associated with each stator assembly. The compensation coil is disposed at a location where it does not exert a significant force on the rotor. It generates a magnetic field to oppose and substantially cancel the stray flux generated by the main coil of the respective stator assembly. To this end, the compensation coil is connected in parallel to the main coil with a balancing resistor in series with the compensation coil to control the current in the compensation coil in such a manner that the product of the current through the compensation coil multiplied by its number of turns equals the corresponding product for the main coil during steady-state conditions, while the direction of the current through the compensation coil is opposite to that of the main coil. This arrangement requires one compensation coil per main coil, i.e., a total of two compensation coils for the complete axial bearing.

In DE 10 2010 013 675 A1 it is suggested to provide two compensation coils per main coil, one of the compensation coils being radially arranged between the main coil and the rotor shaft, while the other compensation coil is arranged radially further outside than the main coil. Both compensation coils are connected in series with the main coil.

U.S. Pat. No. 7,635,937 B2 suggests integrating the compensation coil into the stator and connecting the compensation coil in series with the main coil.

U.S. Pat. No. 5,682,071 discloses a magnetic bearing device comprising a constant-current source. The constant-current source feeds a constant total current to two coils in parallel, the two coils being arranged on opposite sides of a rotor. Sensing means detect movements of the rotor and inform a controller, which responds by controlling the respective current to each coil to maintain the rotor in a desired position. The other end of each coil is connected to an arrangement of switches and freewheeling diodes. The document is silent about stray-flux compensation.

WO 2005/121580 A1 discloses a magnetic bearing device in which two coils placed on opposite sides of a rotor are connected to an amplifier device in a series configuration. A bias current is fed from the amplifier device through the series-connected coils. A control current is fed from the amplifier device to a common node between the series-connected coils to increase the current in one of the coils while decreasing the current in the other coil. This document is also silent about stray-flux compensation.

SUMMARY OF THE INVENTION

It is an object of the present invention to provide a magnetic bearing device exhibiting reduced stray flux while having a simple set-up.

The present invention provides a magnetic bearing device for magnetically suspending a rotor for rotation about a rotation axis. The magnetic bearing device comprises an amplifier device, a first main coil extending around the rotation axis, and a second main coil extending around the rotation axis. Each of the main coils has two terminals. One terminal of the first main coil is connected to a first output of the amplifier device, and one terminal of the second main coil is connected to a second output of the amplifier device. The other terminals of the main coils are connected with one another to form a common node. The main coils cause a stray flux when being supplied with currents by the amplifier device. In order to diminish the stray flux, the magnetic bearing device comprises a compensation coil connected between the third output of the amplifier device and the common node, the compensation coil also extending around the rotation axis. In other words, the common node is connected to the third output of the amplifier device via the compensation coil. The first main coil, the second main coil and the compensation coil are connected to the amplifier device with such winding directions and polarities that any current that flows between the amplifier device and the common node through the compensation coil causes a magnetic field that diminishes the stray flux caused by the main coils.

The terminals of each of the main coils and of the compensation coils can be designated as a "first" and a "second" terminal. In the present document, the term "winding direction" is to be understood as designating the sense of a DC current around the rotation axis when the DC current flows from the first terminal to the second terminal of the coil. The winding direction is "positive" when the sense of the current is right-handed around the rotation axis, and it is "negative" when the sense of the current is left-handed. Furthermore, in the present document, the following sign convention is used for defining current directions: A value of a DC current has positive sign if the current flows away from the amplifier and through a coil into the common node. It has negative sign if the current flows in the opposite direction.

The winding directions and polarities of the coils should be chosen as follows: For all coils, a DC current should have the same direction (sense) around the rotation axis whenever it has a positive value (i.e., whenever it flows from the respective output of the amplifier device through the respective coil to the common node). Since the sum of the (signed) values of the currents flowing into the common node must be zero according to Kirchhoff's current law, the current that flows through the compensation coil will always have a value that is the negative value of the sum of the currents through the main coils. Therefore, the current through the compensation coil will automatically cause a magnetic field that counteracts the magnetic fields caused by the currents in the main coils, thereby diminishing the stray flux.

In particular, if the main coils and the compensation coil all have identical winding directions around the rotation axis, the main coils and the compensation coil should all be connected to the amplifier device with identical polarity. In other words, if all coils have identical winding directions, the first terminal of each coil should be connected to the amplifier device, while the second terminal should be connected to the common node. If the winding directions of the coils are not all identical, the polarities with which the coils should be connected between the amplifier device and the common node can readily be selected accordingly.

Advantageously, the first main coil, the second main coil and the compensation coil have essentially the same number of turns around the rotation axis. In this manner, the sum of the magnetomotive forces of the two main coils and the compensation coil will be essentially zero. In the present context, the magnetomotive force is given by the product of the (signed) value of the current and the (signed) number of windings of each coil, a positive sign of the number of windings indicating a positive winding direction, and a negative sign of the number of windings indicating a negative winding direction.

If the magnetic bearing device comprises a housing, it is advantageous if the housing encloses not only the main coils, but also the compensation coil. This is particularly true if the housing comprises a magnetically conductive material, since then the housing will generally form part of a stray flux path for the magnetic stray fields caused by the main coils. The housing will then at the same time also form part of a compensation flux path for the counteracting magnetic field caused by the compensation coil.

The present invention is advantageously implemented in an active axial magnetic bearing. In this case, the magnetic bearing device comprises a first axial stator assembly comprising the first main coil and a second axial stator assembly comprising the second main coil. The rotor and both axial stator assemblies comprise magnetically conductive material. Each axial stator assembly and the rotor together define a magnetic control flux path that extends across gaps between the respective axial stator assembly and the rotor. The first axial stator assembly is arranged relative to the rotor in such a manner that a first current through the first main coil generates a first control flux in the first control flux path, which causes an attractive magnetic force between the first axial stator assembly and the rotor in a first axial direction, while the second axial stator assembly is arranged relative to the rotor in such a manner that a second current through the second main coil generates a second control flux in the second control flux path, which causes an attractive magnetic force between the second axial stator assembly and the rotor in a second axial direction opposite to the first axial direction. For instance, the rotor can comprise a disk-shaped portion, and the axial stator assemblies can then face different axial sides of the disk-shaped portion. However, other shapes of the rotor are possible. The compensation coil is arranged outside of the control flux paths of the main coils. In this manner a third current through the compensation coil causes substantially no axial magnetic force onto the rotor when it generates the compensation flux.

The compensation coil can be arranged in various locations of the magnetic bearing device according to the availability of space. For instance, the compensation coil can be arranged adjacent to one of the axial stator assemblies. If the magnetic bearing device comprises an active radial magnetic bearing in addition to the active axial magnetic bearing, the active radial magnetic bearing comprising a radial stator assembly comprising a plurality of radial coils, it is advantageous to arrange the compensation coil adjacent to the radial stator assembly, radially encompassing the radial coils, since in some magnetic bearing devices sufficient space for the compensation coil may be found in this location.

The compensation coil can be conceptually divided into two or more sub-coils that are connected in series in such a manner that currents through the sub-coils flow in the same direction (sense) around the rotation axis. Since each sub-coil has a reduced number of turns, it may be easier to allocate sufficient space for the sub-coils than for a single compensation coil. Expressed differently, the magnetic bearing device can comprise at least two compensation coils connected in a series configuration between the third output of the amplifier device and the common node, each compensation coil extending around the rotation axis, the compensation coils being connected in such a manner that currents through the compensation coils flow in the same direction (sense) around the rotation axis. Advantageously, the compensation coils together have essentially the same number of turns around the rotation axis as each of the first main coil and the second main coil.

More specifically, in an axial magnetic bearing, one of the compensation coils can be arranged adjacent to the first axial stator assembly, and another one of the compensation coils can be arranged adjacent to the second axial stator assembly, thereby creating a largely symmetric arrangement. In particular, if the rotor comprises a disk-shaped portion and if the axial stator assemblies face different sides of the disk-shaped portion, the compensation coils can also be arranged on different sides of the disk-shaped portion.

A corresponding method of operating a magnetic bearing device comprises operating the amplifier device to supply a first current through the first main coil, a second current through the second main coil, and a third current through the compensation coil. If the coils are connected with appropriate winding directions and polarities, the third current will then automatically cause a magnetic field that counteracts the magnetic fields magnetic fields caused by the currents in the main coils, thereby diminishing the stray flux.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
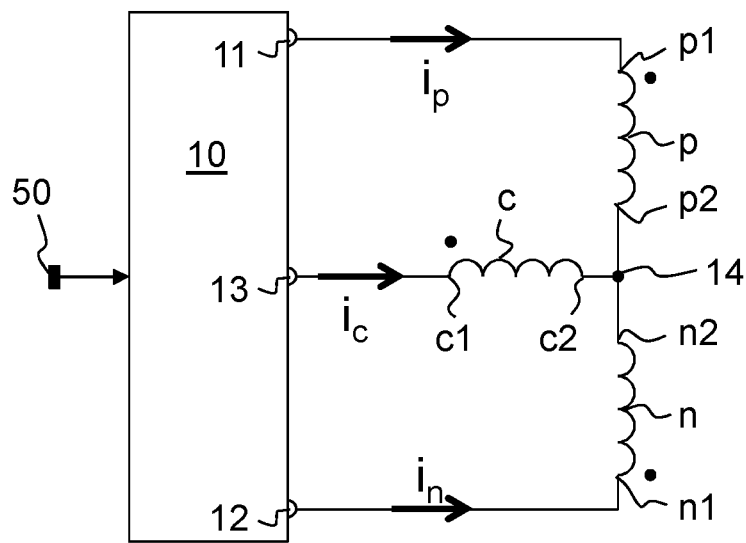
FIG. 1 shows a schematic circuit diagram for a magnetic bearing device according to a first embodiment of the present invention.

FIG. 1 shows a schematic circuit diagram for a magnetic bearing device according to a first embodiment of the present invention. The magnetic bearing device comprises an amplifier 10 having three outputs 11, 12 and 13. The magnetic bearing device further comprises a first main coil p and a second main coil n. At one of its ends, the first main coil p defines a first terminal p1, and at its other end, it defines a second terminal p2. Likewise, the second main coil n defines a first terminal n1 and a second terminal n2. The first terminal p1 of the first main coil p is connected to the first output 11 of the amplifier 10. The first terminal n1 of the second main coil n is connected to the second output 12 of the amplifier 10. The second terminal p2 of the first main coil p and the second terminal n2 of the second main coil n are connected to one another to form a common node 14. A compensation coil c having a first terminal c1 and second terminal c2 is connected between the third output 13 of the amplifier 10 and the common node 14. All three coils p, n, and c have identical winding directions around the rotation axis of a rotor, as explained below in more detail in connection with FIG. 2. The winding direction is indicated in FIG. 1 by a dot. If a DC current flows through the respective coil from the terminal indicated by the dot to the other terminal, this current will flow around the rotation axis in the same direction (i.e., in the same sense around the rotation axis).

The amplifier 10 feeds a first current $i_p$ from its first output 11 to the first main coil p, a second current $i_n$ from its second output 12 to the second main coil n, and a third current $i_c$ from its third output 13 to the compensation coil c. A position sensor 50 determines the position of the rotor and informs a controller that is integrated with the amplifier 10. Based on the position signals, the controller controls the currents $i_p$, $i_n$ and $i_c$ so as to maintain the rotor in a desired position. Using the sign convention defined above, the currents $i_p$, $i_n$ and $i_c$ fulfill the following condition:

$$i_p + i_n + i_c = 0.$$

Figure 2:
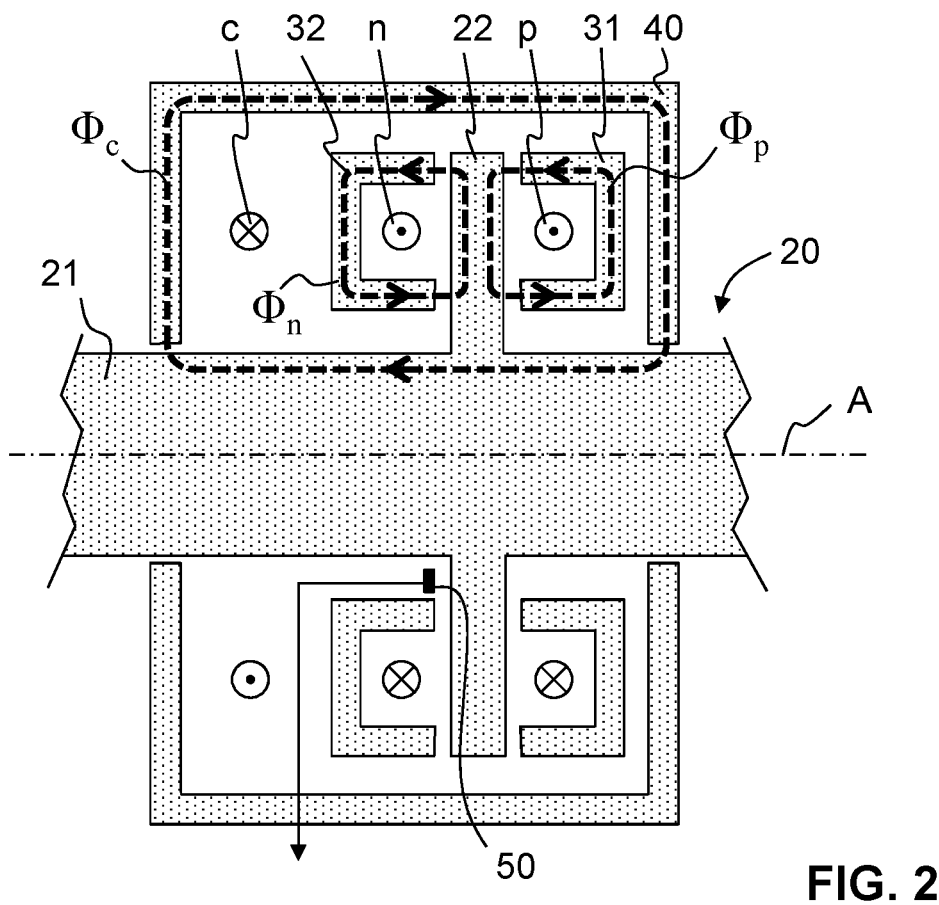
FIG. 2 shows a schematic central longitudinal section of a magnetic bearing device according to a first embodiment in a first mode of operation.

The arrangement of the first main coil p, the second main coil n and the compensation coil c within an axial bearing is illustrated in a highly schematic manner in FIG. 2. A rotor 20 is suspended for rotation about rotation axis A. The rotor 20 comprises an elongated shaft portion 21 and a disk-shaped portion 22, both portions comprising a magnetically conductive material. A first axial stator assembly 31 faces a first axial side of the disk-shaped portion 22, while a second axial stator assembly 32 faces the second axial side of the disk-shaped portion 22. The first axial stator assembly 31 comprises the first main coil p, while the second axial stator assembly 32 comprises the second main coil n. Each axial stator assembly forms a yoke in the form of an annular disk in which an annular groove is formed, the groove being open towards the disk-shaped portion of the rotor, the coil being disposed in the annular groove, and the yoke forming two annular end faces that face the disk-shaped portion 22 of the rotor 20 at different radial positions. The yoke is made of a magnetically conductive material.

The stator assemblies 31, 32 are surrounded by a housing 40, which also comprises a magnetically conductive material. The axial stator assemblies 31, 32 and the housing 40 are stationary. To this end, the magnetic bearing device will generally comprise further components for keeping the stator assemblies and other parts in place. These components are not shown in FIG. 2 for reasons of simplicity. They will usually be non-magnetic and therefore will not carry a significant magnetic flux.

A current flowing through the first main coil p generates a first magnetic field, which is guided by the magnetically conductive materials in the first axial stator assembly 31 and the disk-shaped rotor portion 22, forming a first magnetic control flux $\Phi_p$. Likewise, a current flowing through the second main coil n generates a second magnetic field, which is guided by the magnetically conductive materials in the second axial stator assembly 32 and the disk-shaped rotor portion 22 to form a second magnetic control flux $\Phi_n$. Due to the air gap between each axial stator assembly 31, 32 and the disk-shaped portion 22 of the rotor 20, each stator assembly generates an attractive force acting to pull the disk-shaped portion 22 towards the respective axial stator assembly. In other words, each axial stator assembly acts as an electromagnet that pulls the disk-shaped portion 22 in its direction.

The compensation coil c is arranged in a location where the magnetic field that is caused by current $i_c$ will not cause any significant axial force onto the disk-shaped portion 22 of the rotor 20. This is achieved by arranging the compensation coil c in such a position that the magnetic flux caused by the compensation coil c (the compensation flux $\Phi_c$) does not overlap with the flux paths of the control fluxes $\Phi_p$ and $\Phi_n$. Furthermore, the compensation flux $\Phi_c$ should not extend across an axial air gap with the disk-shaped portion 22. In the schematic example of FIG. 2, the compensation flux $\Phi_c$ primarily passes through the housing 40 and the shaft portion 21 of rotor 20, but never crosses an air gap with disk-shaped portion 22.

The total stray flux $\Phi_{stray}$ caused by the currents in the three coils p, n and c is proportional to the sum of the magnetomotive forces of the three coils, the constant of proportionality being dependent on geometry, materials etc. The total stray flux can be expressed as follows:

$$\Phi_{stray} = \text{const} * (N_p i_p + N_n i_n + N_c i_c),$$

where $N_p$, $N_n$, and $N_c$ designate the number of turns of coils p, n and c, respectively. The sign of $N_p$, $N_n$, and $N_c$ is positive if the winding direction around the rotation axis is left-handed and negative if the winding direction is right-handed.

If all three coils have the same winding direction and the same number of turns $N=N_p=N_n=N_c$, the stray flux $\Phi_{stray}$ will be zero:

$$\Phi_{stray}=\text{const}*(N_p i_p+N_n i_n+N_c i_c)=\text{const}*N*(i_p+i_n+i_c)=0.$$

If the number of turns of the compensation coil is different from the number of turns of the main coils, the compensation coil will still act to reduce the stray flux caused by the main coils.

The proposed arrangement of coils has several advantages. Only one single compensation coil is required. Only three leads are required between the amplifier and the coils inside the magnetic bearing.

FIG. 2 illustrates a first possible mode of operation of the amplifier device. In this mode of operation, a bias current is supplied at the third output 13 of the amplifier to flow through the compensation coil c towards the common node 14 (or vice versa). The bias current is split at the common node 14 to flow in parallel through both main coils p and n. The amplifier controls the first and second outputs 11, 12 in such a manner that the portion $i_p$ of the bias current that is carried by the first main coil p and the portion in that is carried by the second main coil n are varied in order to achieve position control in the bearing.

In this mode of operation, the currents $i_p$, $i_n$ and $i_c$ will flow around the rotation axis in the directions as indicated in FIG. 2: Assuming that the current $i_p$ in the first main coil p flows in a right-handed sense around the rotation axis, as indicated by the dots and crosses in FIG. 2, then the current $i_n$ through the second main coil n will also flow in a right-handed sense as long as none of the currents is increased beyond the bias current $i_c$. Therefore, the control fluxes $\Phi_p$ and $\Phi_n$ will both have the same sense around the two main coils, as indicated by the arrows in FIG. 2. The current $i_c$ in the compensation coil will automatically flow in the opposite sense around the rotation axis, causing a compensation flux $\Phi_c$ that counteracts the stray fluxes caused by the main coils.

For this mode of operation, the amplifier can, for instance, be configured as in U.S. Pat. No. 5,682,071. In particular, the amplifier can comprise a constant-current source providing a constant bias current to output 13, while each one of outputs 11 and 12 is connected to a switch and a freewheeling diode. The switch acts to selectively connect the respective output to a defined potential level so as to change the current flowing through the respective coil, while the freewheeling diode allows current to flow between the respective output and the constant-current source when the switch is open. However, other configurations of the amplifier are conceivable as well, and the bias current flowing through output 13 does not necessarily need to be constant.

In this mode of operation, the load inductance seen by the amplifier is not increased by the compensation coil because the compensation coil is in the bias current path only, which is essentially constant.

Figure 3:
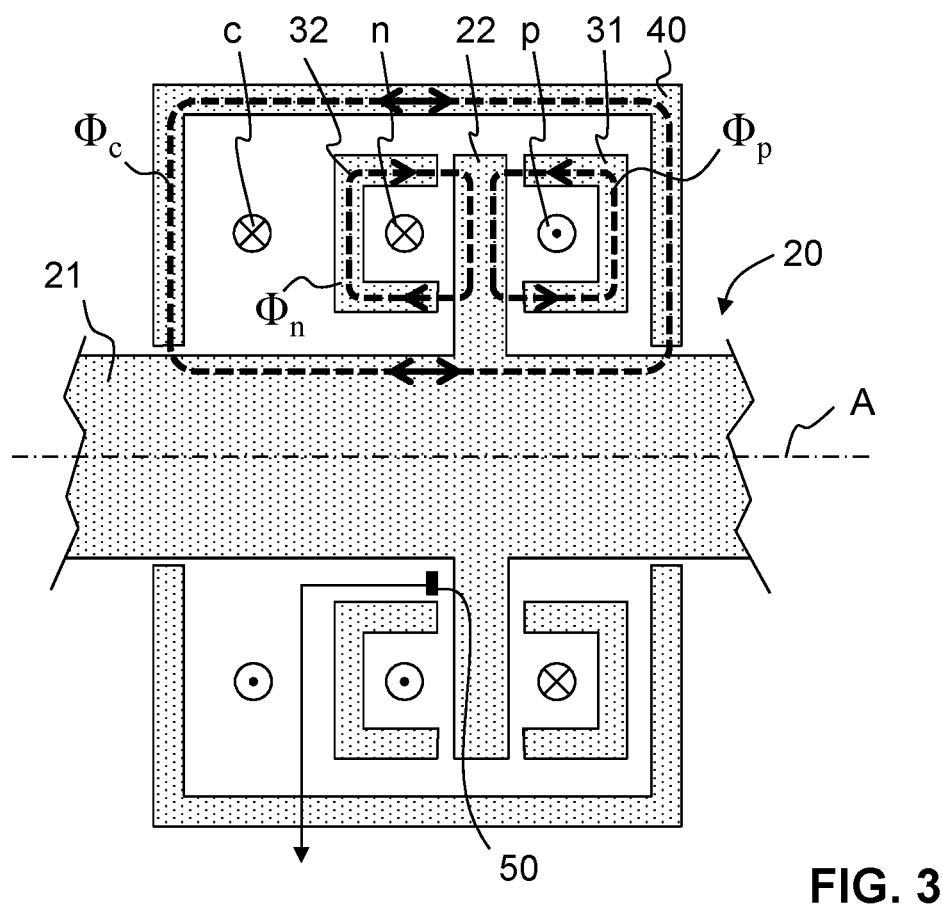
FIG. 3 shows a schematic central longitudinal section of the magnetic bearing device according to the first embodiment in a second mode of operation.

FIG. 3 illustrates a second possible mode of operation of the amplifier device. In this mode of operation, a bias current flows from the first output 11 of the amplifier through both main coils p, n and to the second output 12 of the amplifier (or vice versa). A variable control current $i_c$ is supplied between the third output 13 and the common node 14 through the compensation coil c. Depending on its direction, the control current $i_c$ adds to the bias current in one of the main coils and reduces the bias current in the other main coil or vice versa.

As long as no control current is present, i.e., as long as only the bias current is applied, the sum of the signed values of the currents through the main coils is zero, and the currents $i_p$ and $i_n$ flow in opposite directions around the rotation axis, as indicated in FIG. 3. Therefore, the stray fluxes caused by these currents will cancel. A stray flux will only be present as long as a control current is supplied to the main coils p and n. The stray flux will be proportional to the sum $i_p+i_n$ of the signed values of the currents in the main coils. This sum is just the negative value of the control current $i_c$:

$$i_c=-(i_p+i_n).$$

The stray flux caused by the currents in the main coils is therefore compensated by the counteracting magnetic field caused by the control current $i_c$ through the compensation coil.

A suitable amplifier device for this configuration is disclosed in WO 2005/121580 (see FIG. 19). In that document, a bias current is fed between the first and second outputs of the amplifier device through the series-connected main coils, and a variable control current flows between the third output and the common node, which either increases the current in one of the coils to be above the bias current while decreasing the current in the other coil to be below the bias current, or vice versa.

An additional advantage of the second embodiment is that the bias current for creating the pre-magnetization of the bearing does not flow through the compensation coil. Thereby, ohmic losses in the compensation coil are minimized. The load inductance seen by the amplifier is not increased by the compensation coil because the compensation coil acts to reduce the field of the main coils and therefore tends to reduce the total inductance of the system.

The compensation coil can be positioned in various different locations of the magnetic bearing device, depending on where sufficient space is available. Ideally, the compensation coil is placed close to the shaft portion of the rotor in order to keep the diameter of the compensation coil as small as possible, thereby reducing the amount of copper needed for the compensation coil. It is desirable to place the compensation coil close to the axial bearing in order to keep the amount of cabling to a minimum. A highly suitable location for the compensation coil would be radially between the shaft portion of the rotor and one of the axial stator assemblies. Another, albeit slightly less preferred location would be radially surrounding one of the axial stator assemblies, or axially adjacent to one of the axial stator assemblies.

Figure 4:
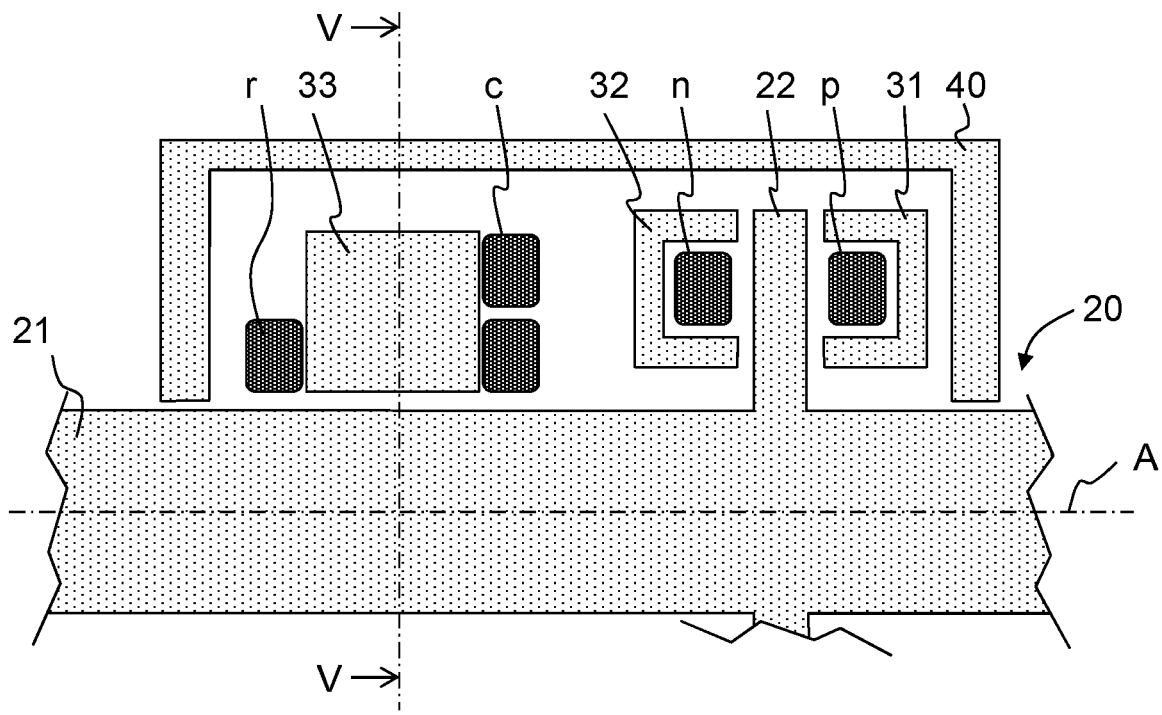
FIG. 4 shows a schematic central longitudinal section of a magnetic bearing device according to a second embodiment in sectional plane IV-IV of FIG. 5.
Figure 5:
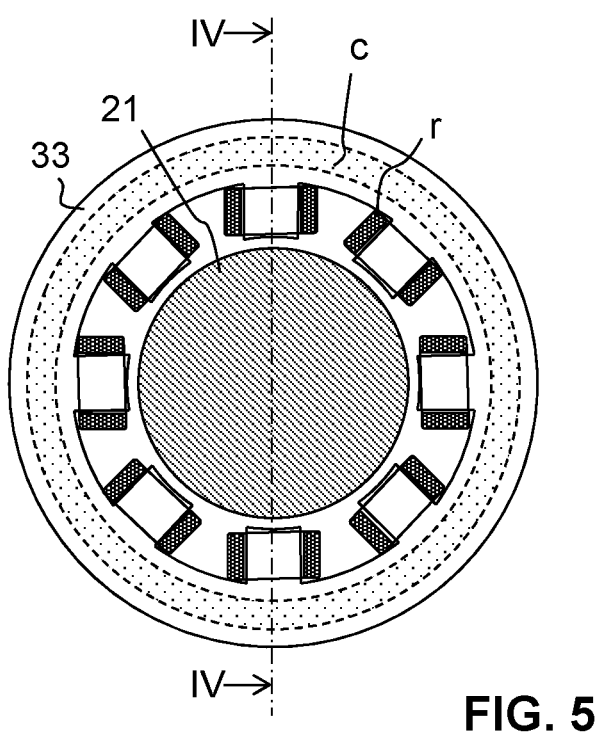
FIG. 5 shows a schematic cross section of the magnetic bearing device according to the second embodiment in sectional plane V-V of FIG. 4, the out-of-plane location of the compensation coil being indicated by phantom lines.

FIGS. 4 and 5 illustrate another suitable location. In this embodiment, the magnetic bearing device further comprises a radial bearing that is disposed in the same housing 40 as the axial bearing. The radial bearing comprises a radial stator assembly 33 carrying a plurality of radial coils r. The radial stator assembly 33 comprises an annular portion that encompasses the pole portions carrying the radial coils r. The compensation coil can be positioned axially adjacent to this annular portion, radially encompassing the radial coils, as illustrated in FIG. 4. In FIG. 5, the compensation coil is disposed out-of-plane. Its position is therefore indicated by phantom lines.

Figure 6:
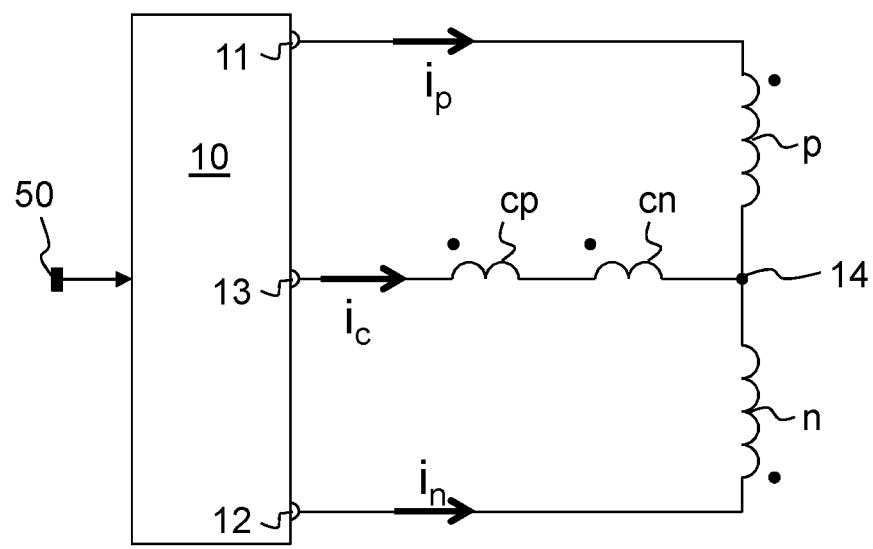
FIG. 6 shows a schematic circuit diagram for a magnetic bearing device according to a third embodiment of the present invention.

FIG. 6 illustrates a third embodiment. In this embodiment, two series-connected compensation coils cp and cn are provided, i.e., the single compensation coil of the previously described embodiments is conceptually split into two series-connected sub-coils. Each one of the compensation coils cp and cn has a number of turns that corresponds to half of the number of turns of the main coils p and n. Both compensation coils cp, cn have the same winding direction and polarity, i.e., the first terminal of coil cp is connected to the third output 13 of amplifier 10, the second terminal of coil cp is connected to the first terminal of coil cn, and the second terminal of coil cn is connected to the common node 14. In this manner, the two compensation coils cp, cn effectively act like a single compensation coil having a number of turns that corresponds to the sum of the number of turns of the two coils cp, cn.

Figure 7:
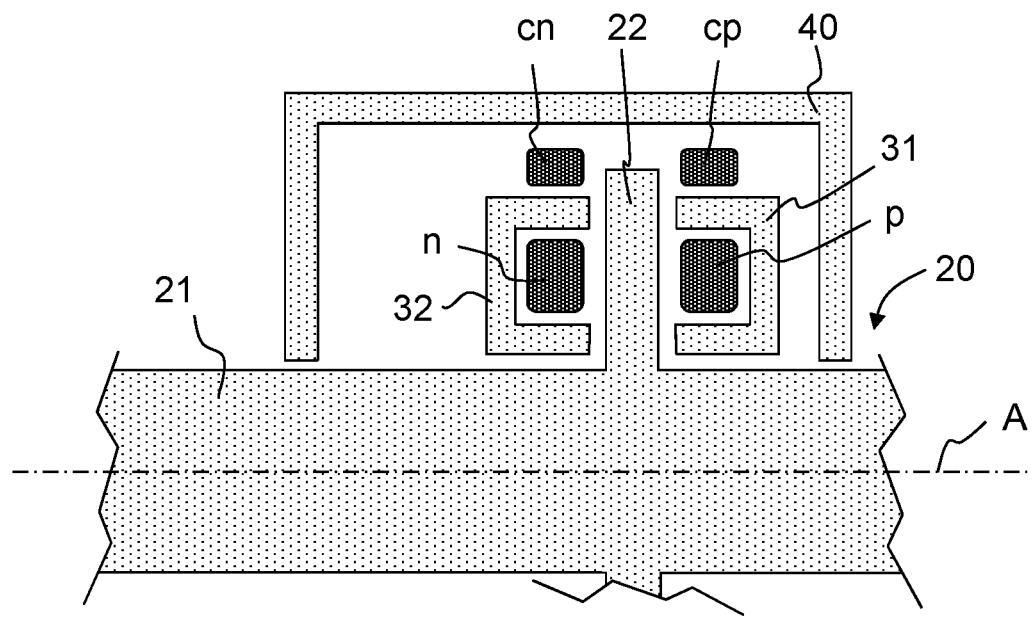
FIG. 7 shows a schematic central longitudinal section of the magnetic bearing device according to the third embodiment.

FIG. 7 illustrates a possible arrangement of the two compensation coils of the third embodiment. Compensation coil cp is arranged adjacent to the first axial stator assembly 31, while the other compensation coil cn is arranged adjacent to the second axial stator assembly 32. Since each compensation coil has only half the number of turns that a single compensation coil would have, less space is needed at the location of each compensation coil. The compensation coils are symmetrically arranged on different sides of the disk-shaped portion 22 of the rotor 20, minimizing any effects that the compensation coils might have onto the control paths of the axial stator assemblies. Of course, other arrangements of the compensation coils are possible as well.

While the invention has been described with reference to exemplary embodiments, it is to be understood that the invention is not limited to these embodiments, and that various modifications are possible without leaving the scope of the present invention.

LIST OF REFERENCE SIGNS 10 amplifier
11 first output
12 second output
13 third output
14 common node
20 rotor
21 shaft portion
22 disk-shaped portion
31 first axial stator assembly
32 second axial stator assembly
33 radial stator assembly
40 housing
50 position sensor
p first main coil
p1 first terminal
p2 second terminal
n second main coil
n1 first terminal
n2 second terminal
c compensation coil
c1 first terminal
c2 second terminal
cp first compensation coil
cn second compensation coil
r radial coil
$\Phi_p$ flux by first main coil
$\Phi_n$ flux by second main coil
$\Phi_c$ flux by compensation coil
$i_p$ current in first main coil
$i_n$ current in second main coil
$i_c$ current in compensation coil

The invention claimed is:

1. A magnetic bearing device for magnetically suspending a rotor for rotation about a rotation axis, the magnetic bearing device comprising:
an amplifier device comprising first, second, and third outputs;
a first main coil extending around the rotation axis, the first main coil having first and second terminals;
a second main coil extending around the rotation axis, the second main coil having first and second terminals; and
at least one compensation coil extending around the rotation axis,
the first terminal of the first main coil being connected to the first output of the amplifier device;
the first terminal of the second main coil being connected to the second output of the amplifier device,
the second terminal of the first main coil being connected to the second terminal of the second main coil at a common node,
the at least one compensation coil being connected between the third output of the amplifier device and the common node,
wherein the first and second main coils cause a stray flux when being supplied with currents by the amplifier device, and
wherein the first main coil, the second main coil and the at least one compensation coil are connected to the amplifier device with such polarities that any current that flows between the amplifier device and the common node through the at least one compensation coil causes a magnetic field that diminishes the stray flux caused by the main coils.

2. The magnetic bearing device of claim 1, wherein each of the first main coil, the second main coil and the at least one compensation coil has essentially the same number of turns around the rotation axis.

3. The magnetic bearing device of claim 1, further comprising a housing, the first main coil, the second main coil and the at least one compensation coil being arranged inside the housing.

4. The magnetic bearing device of claim 1, wherein the magnetic bearing device comprises an active axial magnetic bearing, the axial magnetic bearing comprising a first axial stator assembly comprising the first main coil and a second axial stator assembly comprising the second main coil,
the first axial stator assembly and the rotor defining a first control flux path;
the second axial stator assembly and the rotor defining a second control flux path; and
the at least one compensation coil being arranged outside the first and second control flux paths.

5. The magnetic bearing device of claim 4, further comprising an active radial magnetic bearing, the active radial magnetic bearing comprising a radial stator assembly comprising a plurality of radial coils, the at least one compensation coil being arranged adjacent to the radial stator assembly, radially encompassing the radial coils.

6. The magnetic bearing device of claim 1, comprising at least two compensation coils connected in a series configuration between the third output of the amplifier device and the common node, each compensation coil extending around the rotation axis.

7. The magnetic bearing device of claim 6, wherein the compensation coils together have essentially the same number of turns around the rotation axis as each of the first main coil and the second main coil.

8. The magnetic bearing device of claim 6, wherein the magnetic bearing device comprises an active axial magnetic bearing, the axial magnetic bearing comprising a first axial stator assembly comprising the first main coil and a second axial stator assembly comprising the second main coil, the first axial stator assembly and the rotor defining a first control flux path;

the second axial stator assembly and the rotor defining a second control flux path, wherein one of the compensation coils is arranged adjacent to the first axial stator assembly, and another one of the compensation coils is arranged adjacent to the second axial stator assembly.

9. The magnetic bearing device of claim 1, wherein the amplifier device is configured to supply a bias current between the first output of the amplifier device and the second output of the amplifier device through the first and second main coils, and wherein the amplifier device is configured to supply a variable control current between the third output of the amplifier device and the common node through the at least one compensation coil, the variable control current changing its direction between a first direction and a second direction, the control current in the first direction increasing the current through the first main coil above the bias current while reducing the current through the second main coil below the bias current, and in the second direction reducing the current through the first main coil below the bias current while increasing the current through the second main coil above the bias current.

10. A method of operating a magnetic bearing device, the magnetic bearing device comprising:

an amplifier device comprising first, second, and third outputs;

a first main coil extending around the rotation axis, the first main coil having first and second terminals;

a second main coil extending around the rotation axis, the second main coil having first and second terminals; and at least one compensation coil extending around the rotation axis, the first terminal of the first main coil being connected to the first output of the amplifier device;

the first terminal of the second main coil being connected to the second output of the amplifier device, the second terminal of the first main coil being connected to the second terminal of the second main coil at a common node, the at least one compensation coil being connected between the third output of the amplifier device and the common node, the method comprising:

operating the amplifier device to supply a first current through the first main coil, a second current through the second main coil, and a third current through the at least one compensation coil, wherein the first and second main coils, by being supplied with the first and second currents, cause a stray flux, and wherein the first main coil, the second main coil and the at least one compensation coil are connected to the amplifier device with such polarities that the third current that flows between the amplifier device and the common node through the at least one compensation coil causes a magnetic field that diminishes the stray flux caused by the main coils.

11. The method of claim 10, wherein the amplifier device supplies a bias current between the first output of the amplifier device and the second output of the amplifier device through the first and second main coils, and wherein the amplifier device supplies a variable control current between the third output of the amplifier device and the common node through the at least one compensation coil, the variable control current changing its direction between a first direction and a second direction, the control current in the first direction increasing the first current through the first main coil above the bias current while reducing the second current through the second main coil below the bias current, and in the second direction reducing the first current through the first main coil below the bias current while increasing the second current through the second main coil above the bias current.

* * * * *